United States Patent
Blank et al.

(10) Patent No.: US 8,941,397 B2
(45) Date of Patent: Jan. 27, 2015

(54) MOVEMENT AND POSITION IDENTIFICATION SENSOR

(75) Inventors: Thomas Blank, Karlsruhe (DE); Marco Hager, Eggenstein-Leopoldshafen (DE); Dominic Huber, Offenburg (DE)

(73) Assignees: Karlsruher Institut Fuer Technologie, Karlsruhe (DE); Sensolute GmbH, Eggenstein-Leopoldshafen (DE)

( * ) Notice: Subject to any disclaimer, the term of this patent is extended or adjusted under 35 U.S.C. 154(b) by 110 days.

(21) Appl. No.: 13/883,110

(22) PCT Filed: Nov. 9, 2011

(86) PCT No.: PCT/EP2011/069734
§ 371 (c)(1),
(2), (4) Date: May 15, 2013

(87) PCT Pub. No.: WO2012/062800
PCT Pub. Date: May 18, 2012

(65) Prior Publication Data
US 2013/0221994 A1   Aug. 29, 2013

(30) Foreign Application Priority Data
Nov. 9, 2010   (DE) .................. 10 2010 060 456

(51) Int. Cl.
| G01R 27/08 | (2006.01) |
| G01B 11/14 | (2006.01) |
| H01H 1/16 | (2006.01) |
| H01H 35/02 | (2006.01) |
| H01H 35/14 | (2006.01) |

(52) U.S. Cl.
CPC .............. *G01B 11/14* (2013.01); *H01H 1/16* (2013.01); *H01H 35/02* (2013.01); *H01H 35/142* (2013.01)
USPC ........................................................ 324/691

(58) Field of Classification Search
USPC ............... 324/600, 619–620, 425, 439, 446, 324/762.01, 500, 539, 543
See application file for complete search history.

(56) References Cited

U.S. PATENT DOCUMENTS

| 3,927,286 | A | 12/1975 | Foehl |
| 4,434,337 | A | 2/1984 | Becker |
| 5,410,113 | A | 4/1995 | Mielke |
| 5,619,133 | A * | 4/1997 | Shank et al. ............. 324/207.24 |
| 6,215,299 | B1 * | 4/2001 | Reynolds et al. .......... 324/207.2 |
| 7,845,234 | B2 | 12/2010 | Shimase |
| 7,897,887 | B2 | 3/2011 | Blank |
| 8,146,432 | B2 | 4/2012 | Shimase |
| 2009/0266168 | A1 | 10/2009 | Shimase |
| 2010/0059345 | A1 | 3/2010 | Blank |
| 2011/0088478 | A1 | 4/2011 | Shimase |

FOREIGN PATENT DOCUMENTS

| DE | 3912926 C1 | 12/1990 |
| DE | 10158416 C1 | 7/2003 |
| EP | 1939911 A1 | 7/2008 |
| WO | 2008071289 A1 | 7/2008 |

* cited by examiner

*Primary Examiner* — Melissa Koval
*Assistant Examiner* — Trung Nguyen
(74) *Attorney, Agent, or Firm* — Abel Law Group, LLP (57) ABSTRACT

The present invention relates to a movement sensor that comprises a plurality of plate-type layers on which individual sensors are arranged. The layers are configured in the way set forth in the claims.

11 Claims, 6 Drawing Sheets

MOVEMENT AND POSITION IDENTIFICATION SENSOR

BACKGROUND OF THE INVENTION

1. Field of the Invention

The present invention relates to a movement sensor and to the use thereof for position and movement detection.

2. Discussion of Background Information

Movement sensors have been known for decades. They primarily serve the purpose of detecting simple movements. They exist in different variants, with all of them having in common the fact that they contain a conductive ball or a drop of mercury. Such apparatuses are known e.g. from U.S. Pat. No. 3,927,286 and U.S. Pat. No. 4,434,337.

U.S. Pat. No. 5,410,113 A discloses a movement sensor comprising a plurality of plate-type layers on which individual sensors are arranged. The cover plate and the base plate each have a sensor-associated surface, which are connected to connection contacts via conductor tracks. A chamber plate having a cutout is arranged between the cover plate and the base plate. The sensor-associated surfaces of the cover plate and of the base plate are arranged with register accuracy over the openings of the cutout of the chamber plate. This gives rise to a hollow chamber, the inner surfaces of which are electrically conductive. An electrically conductive ball is arranged in the hollow chamber.

EP 1 939 911 furthermore discloses a vibration sensor in which, in a manner similar to that in the case of U.S. Pat. No. 5,410,113, a movement sensor is constructed from a plurality of plates comprising cover, chamber plate and base plate. A ball is situated in the hollow chamber formed by the stacking of the plates, the hollow chamber being electrically conductive at its inner surfaces.

What is disadvantageous about the systems described is that a multiplicity of contact columns arise when a plurality of individual sensors are used. This has considerable disadvantages in terms of production engineering and costs. It is furthermore disadvantageous that a fast and parallel functional test of the individual sensors is not possible in the case of the sensors described.

DE 10 158 416 C1 and WO 002008071289 A1 disclose movement sensors of plate design which react on account of a mechanical excitation with a change in resistance at the outer connections. The movement sensor described in DE 10 158 416 C1 is constructed from three plates. A base plate and top plate enclose a chamber plate, which has a hole centrally. This gives rise to a cavity, in which a ball is arranged. The cover, just like the base, can have an inner sensor-associated surface, a cover contact pad. The relevant construction technology does not allow detection of the position in which the switch is situated with the gravitational field.

DE 10 158 416 C1 alternatively describes a construction in which the sensor has three sensor-associated surfaces. In this configuration, cover and base contact pads are led parallel to the outer contact pad. Consequently, only movement detection independent of the position is possible, to be precise independently of whether the sensor leans with the cover or with the base toward the ground. Accordingly, it is not possible to differentiate whether the change in resistance of the sensor is caused on account of the conduct between ball, cavity and cover or between ball, cavity and base side.

The sensor in accordance with DE 10 158 416 C1 reacts extremely sensitively to small accelerations and changes its status upon the tiniest of vibrations. A more slowly acting sensor behavior is required, however, in a large number of applications. This holds true particularly in the cases in which electronic devices are intended to be activated only when they are moved to a great extent. In many cases, the intention is also to avoid a situation in which even in the event of a slight vibration within a building, for example triggered by a truck travelling past, devices in a power-saving mode are activated unnecessarily on account of the sensor pulse and thus have an increased power consumption.

What is disadvantageous in the case of DE 10 158 416 C1 and also in the case of WO 00200807128789 A1 is also the fact that a depression is produced in the sensor-associated base surface by means of a drilling process and subsequent production of an electrically conductive sleeve by electrolytic process technologies. This gives rise to a burr in the metallic layer at the drilled edge, which burr can be reduced only by complex mechanical processing steps such as brushing, grinding or lapping. On account of the burr, an excessively elevated location can arise around the depression, the properties of which are disadvantageous. This is because, owing to the hollow wall, the ball will not, or not reproducibly, attain the desired rest position. In WO 002008071289 A1, a stable rest position is not actually desired. This is because the device is designed, rather, for realizing the highest possible sensitivity of the sensor. Therefore, it is not the aim of this invention to produce an increased and adjustable response threshold and a defined rest position.

Accordingly, it is an object of the present invention to provide a movement sensor which no longer has the disadvantages described. The aim of the invention is, inter alia, to provide a movement sensor in which the response threshold of the sensitivity of micro, movement and bearing sensors can be set in wide ranges and, in particular, can be increased. Secondly, what is intended to be achieved is that the ball in the sensor lies in a defined rest position.

SUMMARY OF THE INVENTION

The object according to the invention is by means of a movement sensor comprising a plurality of plate-type layers on which individual sensors are arranged and which are configured in such a way that one plate-type layer is configured as a cover plate and a further layer is configured as a base plate, that the cover plate and base plate have corner points at which connection contacts are arranged, that the cover plate and the base plate each have a sensor-associated surface, which are connected to the connection contacts via conductor tracks, that at least one further plate-type layer configured as a chamber plate having a continuous, preferably cylindrical cutout is arranged between the cover plate and the base plate, that the chamber plate has corner points in which connection contacts are arranged, that the sensor-associated surfaces of the cover plate and of the base plate are arranged with register accuracy over the cutout of the chamber plate, such that a closed hollow chamber is produced, the inner surfaces of which are electrically conductively connected to the connection contacts arranged in the corner points thereof via conductor tracks, that an electrically conductive ball is arranged in the hollow chamber, that the connection contacts are configured as contact columns led through all the plate-type layers, that the cover plate has a conductor track connected to the base plate via the contact column without an electrically conductive connection to the contact surface of the base plate arising, that the cover plate, base plate and the inner surfaces of the cavity of the chamber plate are electrically insulated from one another, preferably by a thin insulating layer.

In principle, the number of plate-type layers can be chosen depending on the area of application. However, a construction comprising three plates, that is to say comprising cover plate, chamber plate and base plate, is preferred according to the invention. The size of the individual plates can vary greatly. Very small formats of from approximately 40×40 mm$^2$ to large formats of 1000×1000 mm$^2$ can be constructed, but the plates preferably have a size of 300×300 mm$^2$. A multiplicity of individual sensors are situated on said plates, said individual sensors being arranged regularly in a matrix. An individual sensor preferably has a size of between 1 mm$^2$ and 20 mm$^2$, particularly preferably a size of 7 mm$^2$.

In the case of the design comprising three plates that is preferred according to the invention, an individual sensor comprises a base plate, a chamber plate and a cover plate. The plates are configured preferably in an angular fashion, particularly preferably in a quadrilateral fashion, extremely preferably in a rectangular or square fashion. The lengths and widths of the plates are preferably identical or approximately identical, but the heights thereof can differ.

The base plate is provided with electrical connection surfaces, by means of which the individual sensor can be permanently electrically connected to the circuit carrier (e.g. the control circuit board of a device) using a suitable electrical connection technique (e.g. soldering, adhesive bonding). The connection surfaces, e.g. the soldering connection points, are situated on one side of the base plate, that is to say the underside thereof, which has to be externally accessible.

An electrical contact surface is arranged centrally on the other side of the base plate, that is to say the top side thereof. Said contact surface serves for realizing the sensor-associated functionality in the cavity formed with the chamber plate and the cover plate. In the finished constructed individual sensor, this contact plate is situated on the inside and is hermetically shielded from the environment. The contact surface in the base surface is connected via a conductor track to a soldering connection point (so-called soldering pad) on the underside of the base plate.

The central plate, the so-called chamber plate, has a cutout for producing the cavity, which cutout is configured such that it is preferably approximately cylindrical or cylindrical. Other geometrical shapes are also conceivable, in principle. However, they must be fashioned such that it is possible to produce an electrical contact between hollow chamber and ball. Any desired cutouts are conceivable, in principle. These can likewise be produced by all methods that are familiar to the person skilled in the art. By way of example, the chamber plate can be produced by milling, drilling, stamping or by the injection-molding method. What is essential in any case is that the cutout—also designated as drilled hole hereinafter— is open in each case toward the cover and base plate side. Consequently, the cutout or the drilled hole forms a continuous perforation in the chamber plate, which is therefore preferably configured as a circular hole.

The drilled hole is arranged in such a way that it lies with register accuracy over the contact surface of the base plate. The contact surface of the base plate is preferably accordingly configured in a circular fashion in order that the contact surfaces bear against one another with register accuracy. The drilled hole of the chamber plate is accordingly preferably positioned centrally therein. The wall of the drilled hole is electrically conductive. By way of example, this can be achieved by means of a metal layer applied electrolytically. However, all other methods for producing conductivity that are known to the person skilled in the art are likewise suitable. The wall with the drilled hole constitutes the second contact surface and, in the finished produced state of the individual sensor, forms the inner surface of the cavity in which the ball is accommodated.

The electrically conductive contact surface of the drilled hole is provided with at least one, preferably one or two, electrical conductor tracks that are led to the outer edge of the plate-type individual sensor. Preferably, the conductor tracks are led to one or two corner points of the chamber plate. At the corner point, the chamber plate has a connection contacts preferably embodied in a circular fashion. The contact surface is electrically connected to the outer connection surface (e.g. soldering connection point or soldering pad) of the base plate.

The upper plate, the cover plate, has a likewise preferably circular contact surface on its plane facing the chamber plate. Said contact surface is configured in adaptation to the drilled hole of the chamber plate. If the drilled hole has a different symmetrical shape, an adaptation must accordingly be carried out here. The contact surface is arranged mirror-symmetrically with respect to the contact surface of the base. That is to say that it is likewise preferably arranged centrally with respect to the cover plate. In the same way as the contact surface of the base, the electrically conductive contact surface of the cover plate also has a connection via a conductor track. The latter is connected to a corner or a corner point of the cover plate. Said corner point is likewise preferably equipped with connection contacts configured, in particular, as a semicircle or in a cylindrical fashion. Said connection contacts are electrically contact-connected to the fourth and respectively the third connection contact on the base plate.

The three plates (base plate, chamber plate, cover plate) preferably used according to the invention are laminated in such a way that the contact surfaces of the base plate and of the cover plate are positioned concentrically one above another and above the openings of the drilled hole of the chamber plate. This gives rise to a cavity enclosed by the contact surfaces of the base and cover plates and the inner surface (inner wall) of the drilled hole. A ball is arranged in a freely movable manner in the cavity. The inner surfaces, in particular the base surfaces, are configured as smooth planes and have no elevations whatsoever and are configured in a totally planar fashion, such that the ball is freely movable without being impeded. The cavity produced by the described assembly of base chamber plate and cover plate can have any desired geometrical shapes. A cylindrical configuration is preferred.

The electrical connections between the conductor tracks and the associated soldering connection surfaces (soldering connection points, soldering pads) on the outer side of the base plate are preferably introduced only after the lamination of the base, chamber and cover plates, in order to reduce the number of drilled holes required for producing the sensors and thus to minimize the production costs and production time. The production of the conductor track is preferably effected in an electrolytic process customary in the printed circuit board sector. However, other methods for metallization are also conceivable, e.g. vapor deposition of metal, sputtering.

Position identification by means of a movement sensor becomes possible if the inner sensor-associated contact surfaces of the base and of the cover each have an electrical connection contact which is arranged on the outer sides, preferably toward the corner points of an individual sensor and leads there into an outwardly situated connection surface on the base plate. Each sensor-associated contact surface is linked precisely to one "outer" connection contact. The connection contacts are embodied as a contact column which is led through all the plate-type layers and the inner surfaces of which are electrically conductive. Since the plates are preferably quadrilateral, particularly preferably rectangular or square, the arrangement of the contact columns at the corners is preferred according to the invention.

The sensor-associated contact surfaces of the base plate have conductor tracks configured in such a way that, via the contact column, the sensor-associated contact surfaces of the cover plate are non-conductively connected to the connection contacts (soldering connection points) of the base plate. That is to say that the contact surface of the base plate has a conductor track embodied separately from the contact surface of the cover plate, which also lead separately to the outer soldering connection points (electrical external pads) on the underside of the base plate. This can be achieved e.g. by virtue of the fact that the conductor tracks of the base plate produce a connection to one corner and the conductor track of the cover plate produces a connection to another corner of the respective plate.

Thus, a corner point forms for the conductor connection of the contact surface to the corner point of the base plate, while the second soldering connection point point of the base plate produces the electrical connection of the conductor tracks to the contact surface of the cover plate. As a result, therefore, the base plate and the cover plate are not electrically conductively connected to one another.

For position identification which also operates reliably in the static state, it is furthermore advantageous to extend this sensor by an electronic storage unit, in which the last position of the sensor in the gravitational field is buffer-stored. Even if the ball comes to rest after a position change and the resistance at the outer contact surfaces acquires a high value (be it that the ball does not touch both sensor-associated surfaces simultaneously or indeed touches both sensor-associated surfaces but, on account of excessively low forces, cannot maintain a permanent low-resistance state), the information about the last position of the device can be reliably made available to the user.

For optimum production of the movement sensors it is advantageous to string together the individual sensors with a two-dimensional matrix arrangement. The individual sensors, preferably configured in a quadrilateral fashion, can accordingly be used as sub-matrices in a larger matrix arrangement. According to the invention, preferably four individual sensors are combined. The latter are connected regularly as sub-matrices in a superordinate matrix arrangement. The arrangement of the contact column at the corner points affords the advantages according to the invention. Specifically, the contact column has a quarter-circle-shaped configuration at the corner points. By joining together a plurality of matrix elements, a continuous column in the form of a preferably perpendicular drilled hole arises at the corner points. Consequently, a vertical contact column arises which passes through all three plates and in which the conductor tracks of the adjoining matrix elements can be electrically combined. In the case of the configuration in the form of four sub-matrices, therefore, the vertical contact column is situated in the center of the superordinate matrix. In this case, a respective conductor track of the sensor-associated contact surface of the base plate of one matrix element and of the sensor-associated contact surface of the cover plate of the other matrix element and one or two conductor tracks of the chamber plate of one or two further adjoining matrix elements can be combined in the contact column.

The outer connection surfaces are preferably situated in each case in the center of the matrix composed of parallel individual sensors. The sensor-associated contact surfaces of the four individual sensors are preferably electrically combined exactly in a drilled hole in the center of the assembled matrix by means of conductor tracks. The conductor tracks combined there all originate from different individual sensors, such that in each case exactly one connection remains in the interior of the matrix.

The plate material used is preferably commercially available inexpensive printed circuit board material. However, any other material desired can also be used.

The movement sensor constructed from the plates preferably has four sensor-active contact surfaces, which, in the laminated plate assemblage, are all hermetically shielded from the external environment. The contact surfaces are the surface of the ball introduced into the hollow chamber, the surface (the inner walls) of the drilled hole itself, the contact surface of the base plate and the contact surface on the cover plate. The cavity surface, the ball surface and either the contact surfaces of the base or of the cover are required for the detection of movements. If the ball simultaneously touches the inner wall of the chamber and the contact surface of the base, the resistance between the soldering connection connected to the inner wall of the cavity and the soldering connection connected to the contact surface of the base is low, usually less than 100 ohms, but often also less than 1 ohm. If the ball moves in the chamber on account of a mechanical excitation, the two sensor-associated contact surfaces of the chamber plate and of the base plate are no longer bridged by the ball surface. The resistance between the soldering connection connected to the cavity wall and at the soldering connection arranged at the contact surface of the base is high. The values are usually above 10 megohms, but often also significantly above 30 megohms.

In the case of the particularly preferred miniaturized construction variant having a basic area of the plates of 7 mm$^2$ or less, the ball is generally very small and has a diameter of less than 0.3 to 2 mm, preferably 0.5 to 1 mm, especially preferably less than 1 mm. Thus, the bearing forces of the ball are very low and states can occur in which the ball simultaneously touches both the wall of the drilled hole and the sensor-associated pad of the base (or of the cover), and the resistance of the arrangement is nevertheless very high (>10 megohms). Only the gravitational forces are not always sufficient in this case to guarantee a low contact resistance at the outer connection pads. For this, an additional contact force may be necessary, which is brought about for example on account of the acceleration (deceleration) of the ball.

The system is activated by the movement of the ball, such that and the power consumption rises. In the case of vibrations, e.g. triggered by a truck travelling past, the device in the lowest power-saving mode can be activated possibly undesirably on account of the sensor pulse and thus have an increased power consumption.

In one variant of the invention, therefore, the response threshold of the sensitivity of micro-movement and position sensors of plate design can be set in wide ranges, and in particular can be increased. Moreover, it is possible to predetermine a defined rest position of the ball and thus a switch position of the sensor in a preferred mounting position.

This aim is achieved by modification of the inner surface of the base plate of the hollow chamber. The latter is configured in such a way that a depression, e.g. a circular hole, is introduced into the metallic part of the base contact of the base plate. In said depression, the ball can assume a stable rest position. Preferably, the depression has a depth of only a few μm. The depth is preferably 10μ to 100μ, particularly preferably 20μ to a maximum of 100μ. The depression impedes the free movement in such a way that lightly tapping the sensor no longer suffices to move the ball out of the rest position and thus to bring about a signal change at the outer measurement locations of the sensor. The sensitivity of the sensor can be reduced by a factor of 10 with this simple variant. Moreover, if the depression is arranged such that it is positioned in the center of the base contacts, it is additionally possible, given corresponding central arrangement of the hollow chamber around the contact pad and given suitable ball dimensions, for the sensor to have a high resistance in the rest position. The power consumption in the rest position is reduced to a minimum. A corresponding displacement of the axis of the depression with respect to the chamber can achieve the effect that the switch is closed in the rest position.

It is preferred for the depression in the surface of the base plate not to be produced by drilling or milling. Rather, this is preferably achieved by etching. The modification of the etching resist can be achieved without additional manufacturing steps during the production of the base plate. This type of production simultaneously avoids the formation of a wall at the edge of the depression on account of drilling processes. Rather, the depression has the form of a funnel. That is to say that the surface of the base plate does not have any elevations, but rather only a depression. In other words, the base surface is designed to be totally planar apart from the depression. The disadvantages which can arise in the case of a position of the ball on a drilling burr at the edge of the depression are thus avoided. For the ball specifically cannot lie in a stable manner here. By contrast, in the case of a drilling edge at the depression, it is also possible for the ball to assume a rest position between wall and wall, said rest position not being desirable. As a result of the design according to the invention without drilling burr, this is avoided and the ball attains the rest position solely the of the depression.

The arrangement of the individual sensors in a matrix results in advantages in terms of production engineering and thus results in cost-effective production. The form of construction according to the invention allows, in particular, inexpensive production of movement sensors in large numbers, which sensors, besides movement, also identify the position in which the sensor is situated in a gravitational field. By virtue of the specific arrangement of the individual sensors in the matrix with common contact columns, it is possible to significantly reduce the number of connection contacts. If the individual sensors are produced using printed circuit board technology and the inner surfaces of the contact columns consist of plated-through holes produced by electroplating, the number of drilled holes required for production can be significantly reduced owing to joint use of one drilled hold by the adjacent individual sensors and the production time and the costs can thus be significantly decreased. Furthermore, the specific arrangement of the individual sensors in a regular matrix allows the fast and parallel functional test of the individual sensors.

The movement sensors can also be used for deducing movement of any desired technical devices. Particularly the movement of irons in which the dependence of the position and the movement state is intended to serve to control the temperature of the soleplate, the sensor can be used.

BRIEF DESCRIPTION OF THE DRAWINGS

The invention is described in greater detail below with reference to the figures.

The individual reference signs in the figures have the following meanings:
2,3,4 plate-type layers
5 cavity
6 ball
7 inner surfaces of the cavity
8 connection contact of the base plate
8a, 8b connection contacts of the chamber plate
8c connection contacts of the cover plate
9 conductor tracks of the base plate
9a, 9b conductor tracks of the chamber plate
9c conductor tracks of the cover plate
10, 11, 12, 13 individual sensors
14, 15 contact surfaces
16 installation rings
17 soldering connection points
18 movement sensor
19 switch
20 evaluation electronics
20a input to the evaluation electronics
21 base pad with circular depression
22 outer measurement location
23 conductor track
24 contact in the hollow chamber
25 etching resist before etching
26 whole-area copper support
27 copper after etching with etching resist layer
28 etching resist removed

DETAILED DESCRIPTION OF THE PRESENT INVENTION

Figure 1:
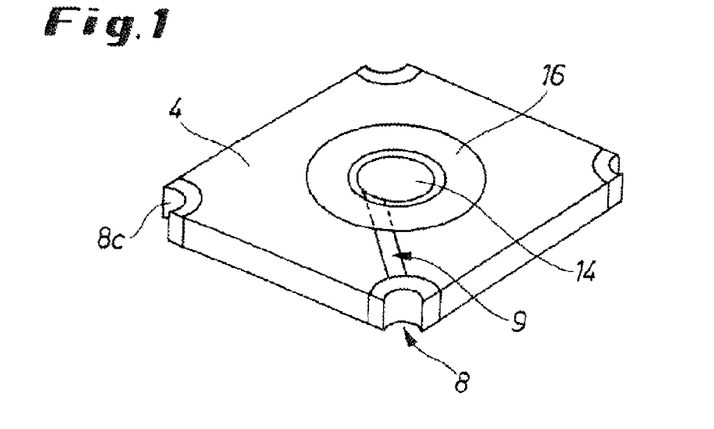
FIG. 1 shows the illustration of a base plate.

The element illustrated in FIG. 1 is the base plate 4. The contact surface 14 is arranged centrally. An electrical connection leads from said contact surface via the conductor tracks 9 to a connection contact 8. The latter is arranged at a corner point of the base plate and configured in a virtually circular fashion.

Figure 2:
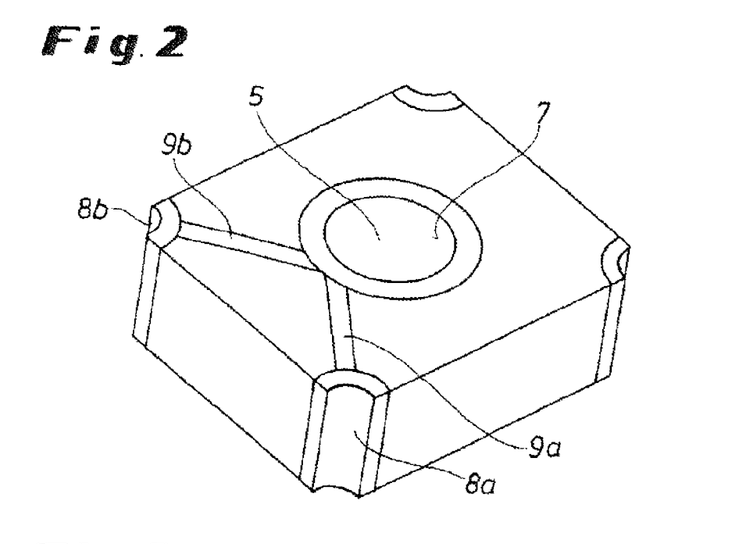
FIG. 2 shows a chamber with central drilled holes.

FIG. 2 illustrates the chamber plate 3. A drilled hole for producing the cavity 5 can be discerned in the center. The inner walls 7 of said drilled hole form the inner surfaces the electrically conductive inner surfaces of the cavity 5. Conductor tracks (in Example 2 conductor tracks), lead from the electrically conductive inner surfaces 7 to two connection contacts 8. Electrically conductive connections to the connection contact of the base plate 4 are involved. The conductor track 9a is accordingly aligned in a manner corresponding to the conductor track 9 of the base plate 4.

Figure 3:
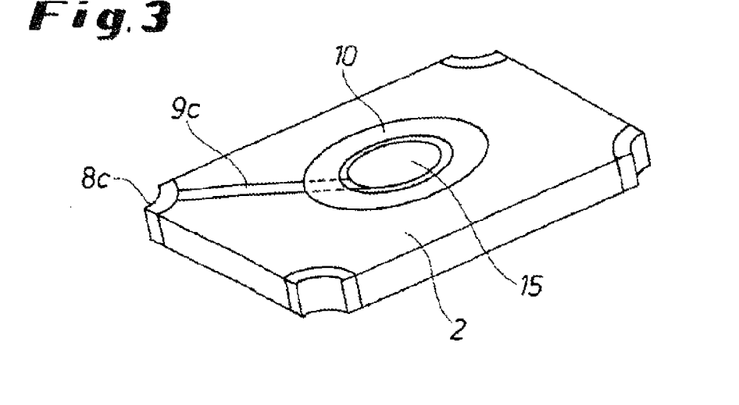
FIG. 3 illustrates the cover plate.

FIG. 3 illustrates the cover plate 2. The latter is aligned mirror-symmetrically with respect to the contact surface 15 of the base plate 4. In the center it contains a contact surface 15 aligned with register accuracy with respect to the drilled hole of the chamber plate 3. The hollow chamber 5 can thereby be produced upon placement of the cover plate 2, the contact surfaces (inner surfaces) of the base plate 4, of the hollow chamber 5 and of the cover plate 2 being conductive. The contact surface 15 is in turn connected to a connection contact 8c to a via a conductor track 9c. Said connection contact is configured in a circular or cylindrical fashion. The cylindrical inner surface of the connection contact 8c contains an electrical connection to a different connection contact of the base plate 4 than the conductor track 9 of the base plate 4. On the other hand, the electrical connection in turn corresponds to the second electrical connection (conductor track 9b) between the inner surface 7 of the cavity 5 of the chamber plate 3 and the other connection contact 8b. A connection between chamber plate 3 and cover plate 2 is produced in this way. On the other side, the contact surface 14 of the chamber plate 3 is in turn electrically connected to the contact surface 15 of the base plate 4 via the conductor track 9a.

The contact surfaces 14 and 15 of base plate 4 and cover plate 2 are provided with installation rings 16. The arrangement with register accuracy over the drilled hole 5 of the chamber plate 3 is thereby ensured. Hermetic shielding from the environment is simultaneously achieved.

Figure 4:
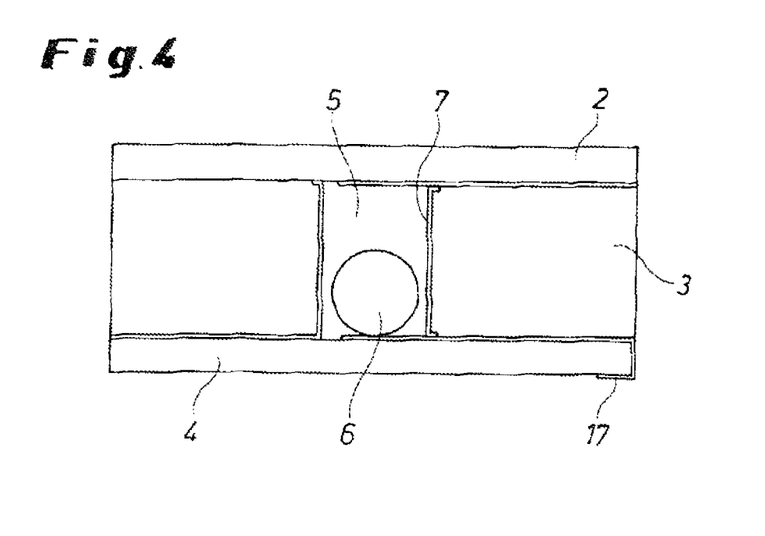
FIG. 4 shows in cross section an individual sensor with base plate, chamber plate and cover plate.

Finally, FIG. 4 reveals the section through an individual sensor with base plate and chamber plate and cover plate. The chamber plate 3 is laminated in between base plate 4 and cover plate 2. This gives rise to the cavity 8 with its conductive inner walls 7 and the ball 6. The conductor tracks 9 are led toward the outside on that side of cover plate 2 and base plate 4 which faces the chamber plate.

Figure 5:
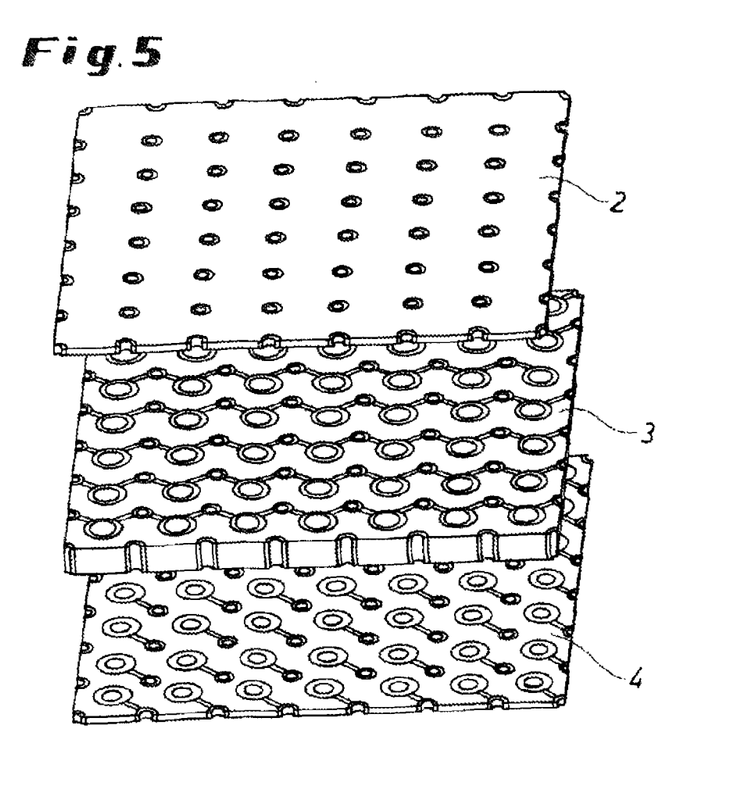
FIG. 5 shows the arrangement of the plates before the laminating step.

FIG. 5 illustrates the arrangement of the individual sensors. The base, chamber and cover plate 4, 3, 2 before the laminating step can be discerned here.

Figure 6:
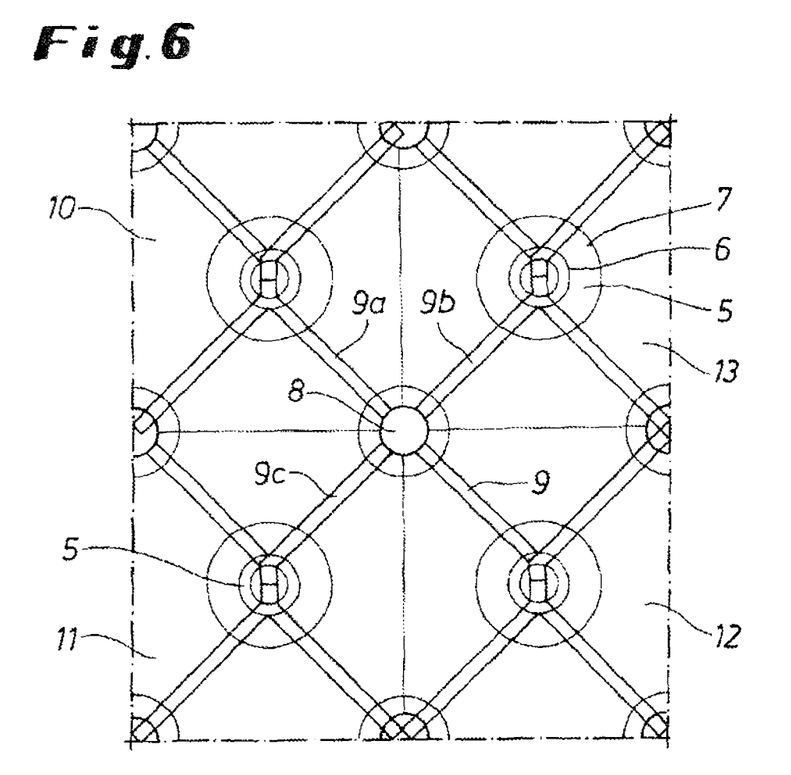
FIG. 6 shows the combination of four matrix elements.

FIG. 6 reveals the combination of four individual sensors 10, 11, 12, 13. Each individual sensor contains in the center the cavity 5 with the ball 6 and the contact surfaces 7. In the individual sensor 10, the conductor track 9a of the chamber plate 3 is connected to the central contact column 8. In the individual sensor 13, the conductor track 9b is likewise connected to the central contact column 8. In the individual sensor 11, the conductor track 9c of the cover plate 2 is in turn connected to the central contact surface 8. Likewise, a connection from the contact surface 15 to the central connection surface 8 is produced via the conductor track 9 of the base plate 4 of the sensor 12. The combined conductor tracks all originate from different individual sensors. On account of this design with the regular arrangement in a main matrix, a movement sensor of plate design can be produced in a cost-effective manner.

Figure 7:
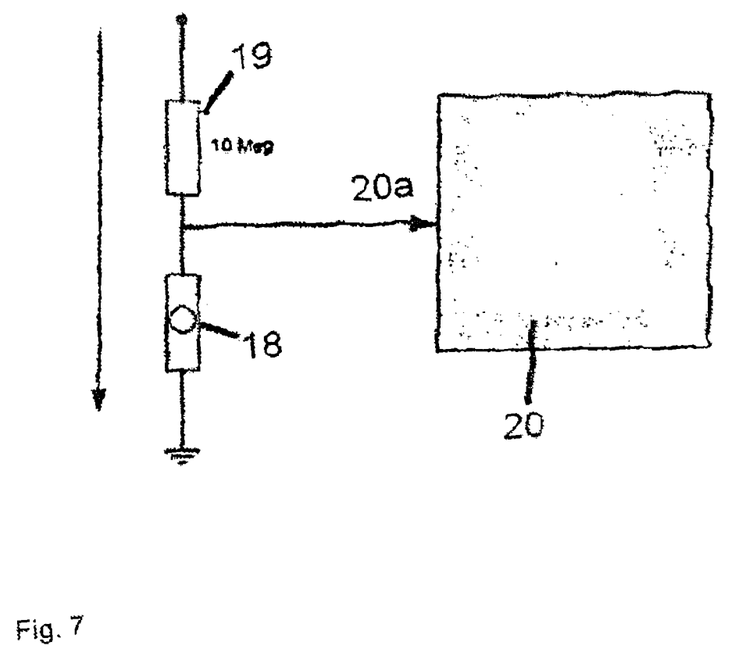
FIG. 7 shows an example of a typical system construction with a movement sensor.

FIG. 7 shows a typical system construction, a voltage change at the input 20a of the evaluation electronics 20 on account of the movement of the ball 6 in the cavity of the movement sensor 18.

Figure 8:
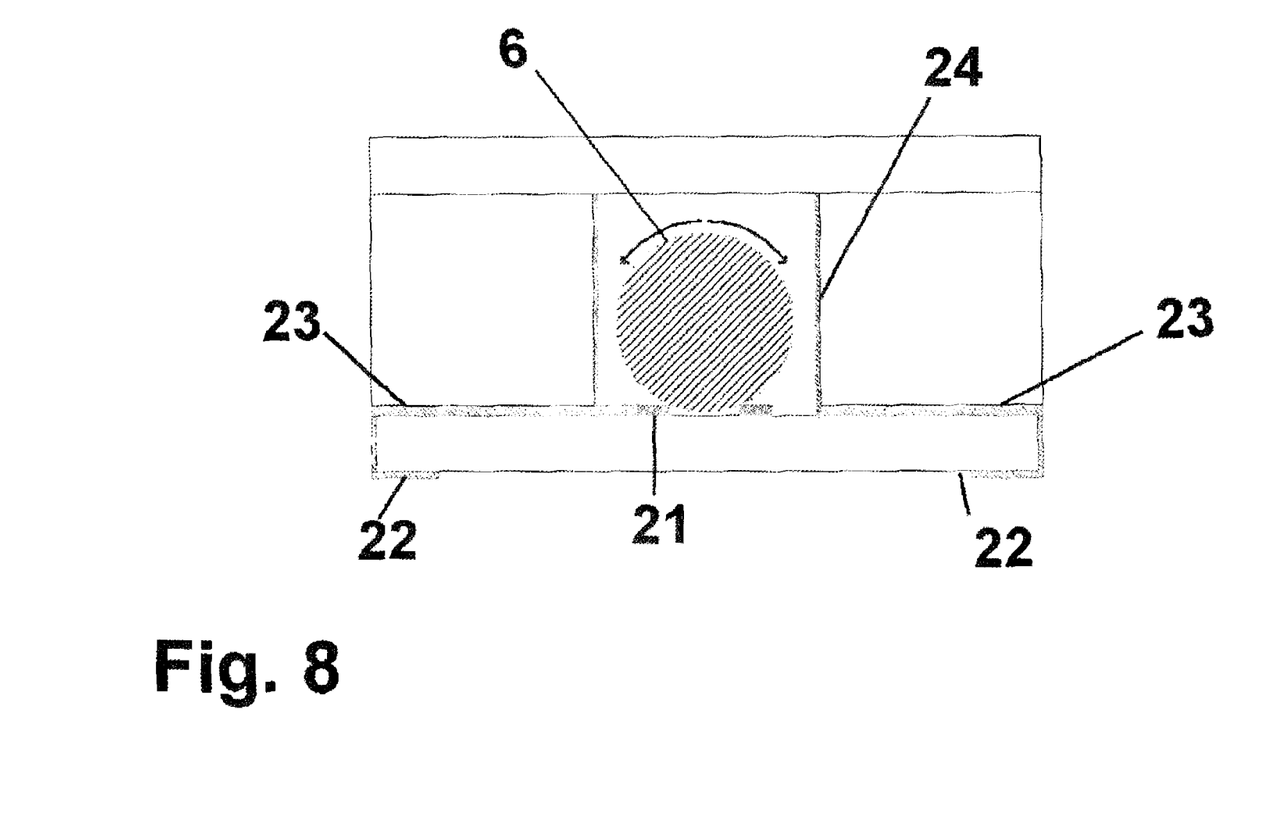
FIG. 8 shows the variant according to the invention of a sensor with a depression in the base plate.
Figure 9:
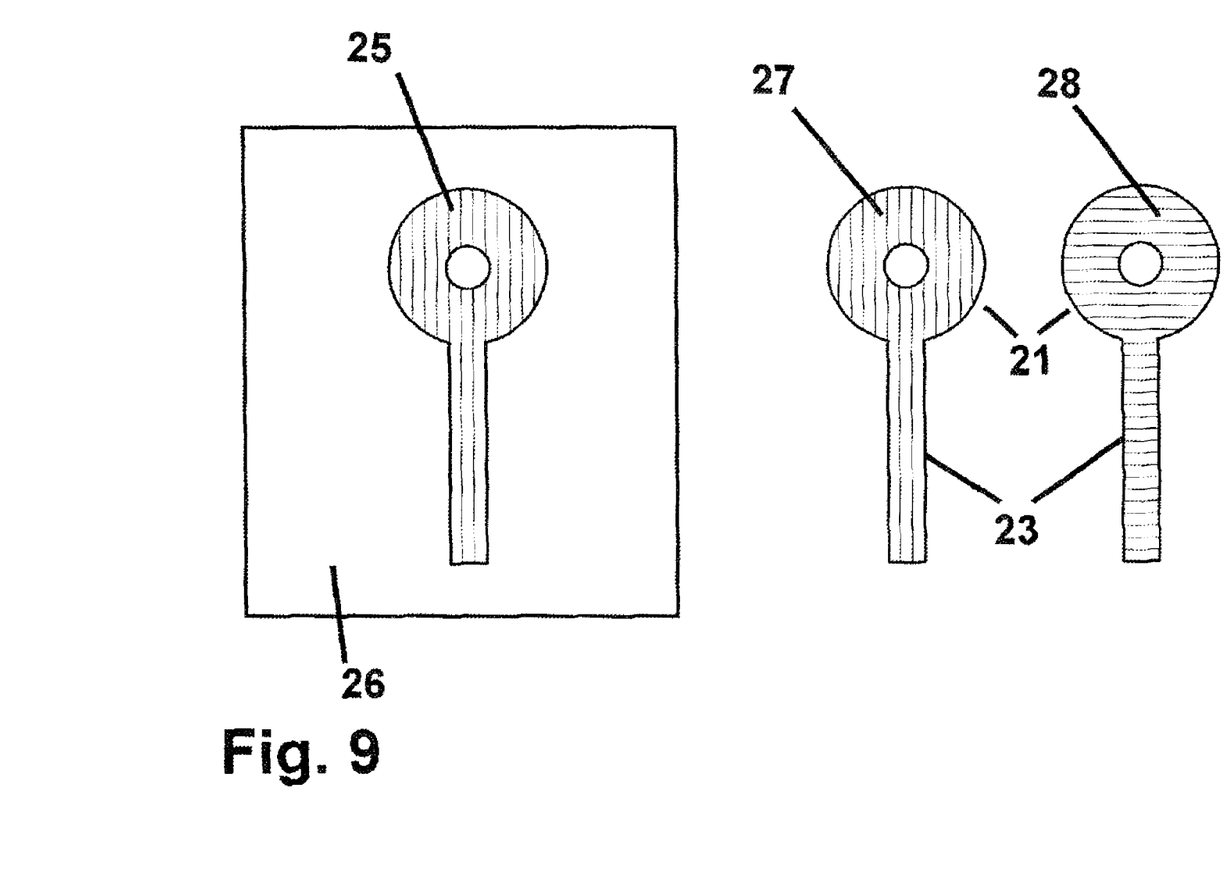
FIG. 9 shows a production variant.

FIG. 8 illustrates the variant according to the invention which can be used to solve the problem of adjusting the sensitivity of the response threshold. The ball 6 in the hollow chamber 5 can be discerned. Contacts are arranged on the vertical wall 24. Contacts are likewise present on the inner surface of the base plate. The conductor tracks 23 lead from the base plate to the outer measurement locations 22. A depression 21 is introduced into the contact surface of the base plate in the hollow chamber 5. The ball 6 attains a rest position in the relevant depression. The depression 21 impedes the free movement of the ball in such a way that slightly tapping the sensor no longer suffices to move the ball out of the rest position. The sensitivity of the sensor can accordingly be reduced with this variant.

FIG. 10 illustrates a particularly simple production variant for reducing the sensor sensitivity. The depression 21 is concomitantly produced directly during the production of the conductor track 23. This is achieved by means of a simple etching process. FIG. 10 reveals the etching resist 25 in the whole-area copper support 26 before etching. The metallic regions which are not covered with etching resist are etched away. After etching, the etching resist (designated by numeral 27) still lies on the copper and is subsequently removed. The modified conductor track with the changed sensor-associated surfaces 14 and 15 arises. The conductor track corresponds to the sensor-associated surfaces (contact surfaces) 14 and 15 with conductor track, the sensor-associated surfaces 14 and 15 now each having a depression.

What is claimed is:

1. A movement sensor, wherein the movement sensor comprises a plurality of plate-type layers on which individual sensors are arranged, and wherein
    one of the layers is configured as a cover plate and one of the layers is configured as a base plate,
    the cover plate and the base plate have corner points in which connection contacts are arranged,
    the cover plate and the base plate each have a sensor-associated surface, which sensor-associated surfaces are connected to the connection contacts via conductor tracks,
    at least one plate-type layer configured as a chamber plate having a cutout is arranged between the cover plate and the base plate,
    the chamber plate has corner points in which connection contacts are arranged,
    the sensor-associated surfaces of the cover plate and of the base plate are arranged with register accuracy over the cutout of the chamber plate, such that a closed hollow chamber is produced, inner surfaces of which are electrically conductively connected to the connection contacts arranged in the corner points thereof via conductor tracks,
    an electrically conductive ball is arranged in the hollow chamber,
    the connection contacts are configured as contact columns led through all plate-type layers,
    the cover plate has a conductor track connected to the base plate via a contact column without an electrical connection to a contact surface of the base plate arising, and
    the cover plate, the base plate and inner surfaces of the hollow chamber of the chamber plate are electrically insulated from one another.

2. The movement sensor of claim 1, wherein the plate-type layers are configured in a quadrilateral fashion.

3. The movement sensor of claim 1, wherein via conductor tracks the chamber plate electrically conductively connects an inner wall of the hollow chamber to the connection contacts.

4. The movement sensor of claim 1, wherein connection contacts configured as a contact column are arranged at corner points of plate-type layers configured in a quadrilateral fashion.

5. The movement sensor of claim 1, wherein the sensor comprises a plurality of individual sensors arranged parallel in such a way that conductor tracks thereof electrically conductively connect inner surfaces of walls of the hollow chambers to a single central connection contact.

6. The movement sensor of claim 5, wherein the central connection contact is formed from corner points of rectangular layers of the sensors arranged parallel.

7. The movement sensor of claim 6, wherein the sensor comprises four individual sensors.

8. The movement sensor of claim 1, wherein the individual sensors have a size of from 1 mm² to 20 mm².

9. The movement sensor of claim 1, wherein the ball has a diameter of from 0.3 mm to 2 mm.

10. The movement sensor of claim 1, wherein an inner surface of the base plate comprises a depression, but no elevation.

11. The movement sensor of claim 10, wherein the depression has a depth of from 10 μm to 100 μm.

\* \* \* \* \*